Nov. 17, 1936.  E. H. MERRITT  2,061,203
ART OF LAMINATING, COATING AND THE LIKE
Filed March 8, 1932  2 Sheets-Sheet 1
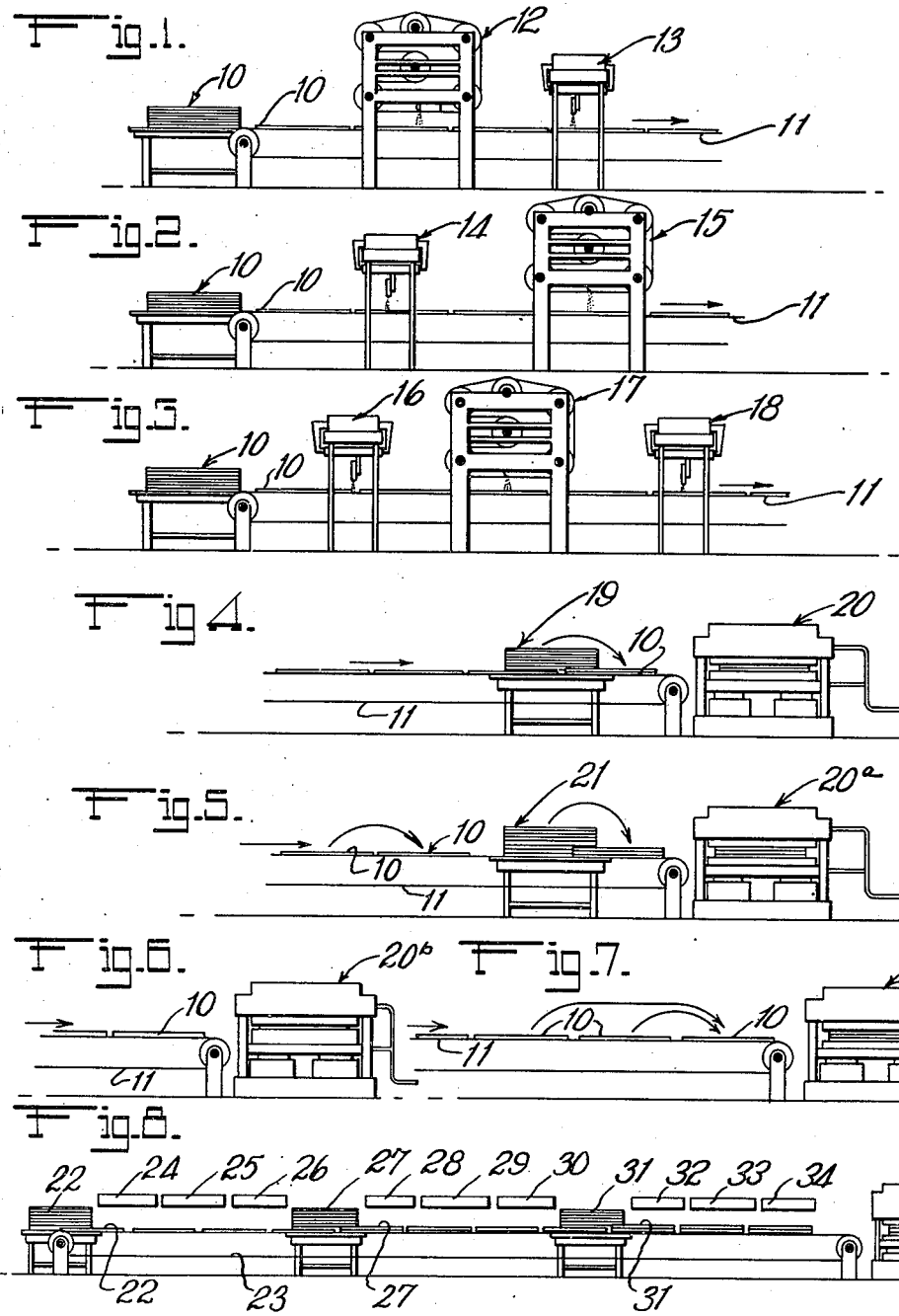
INVENTOR
Ericsson H. Merritt
BY
Warfield & Brown
ATTORNEY Nov. 17, 1936.   E. H. MERRITT   2,061,203

ART OF LAMINATING, COATING AND THE LIKE

Filed March 8, 1932    2 Sheets-Sheet 2

INVENTOR
Ericsson H. Merritt
BY
Warfield and Brown
ATTORNEYS

Patented Nov. 17, 1936

2,061,203

UNITED STATES PATENT OFFICE 2,061,203

ART OF LAMINATING, COATING AND THE LIKE

Ericsson H. Merritt, Lockport, N. Y., assignor to Laminating Patents Corporation, Seattle, Wash., a corporation of Delaware Application March 8, 1932, Serial No. 597,447

21 Claims. (Cl. 154—2)

This invention relates to the art of coating, laminating, and the like, and particularly to procedures of this nature utilizing a synthetic resinous material as the coating or bonding agent.

An object of the invention is the provision of a particularly economical, simple and effective procedure of the character indicated for providing a coating or bond.

Another object is to provide a procedure of the character indicated for forming an especially uniform coating or bond.

A further object is to provide a process whereby the displacement of the particles of a powdered resinous material on a surface being treated is avoided.

Another object is to provide a process whereby a bond of a particularly effective character may be formed.

Another object is the provision of a procedure of the character indicated whereby the reaction of the resinous material is controlled with particular effectiveness.

A further object is the provision of an improved process for securing an object composed of wood to another object.

A further object is the provision of an improved process for the formation of plywood.

Another object is to provide an improved process for coating wood or laminated articles containing a layer of wood.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

For a fuller understanding of the nature and objects of the invention, reference should be had to the following detailed description taken in connection with the accompanying drawings, in which:

Fig. 1 is a somewhat diagrammatic showing of one form of spreading procedure;

Fig. 2 is a similar showing of another form;

Fig. 3 is a similar showing of still another form;

Fig. 4 is a similar showing of one form of finishing procedure;

Fig. 5 is a similar showing of another form;

Fig. 6 is a similar showing of another form;

Fig. 7 is a similar showing of another form;

Fig. 8 is a similar showing of a further modified form of procedure; and

Figure 9:
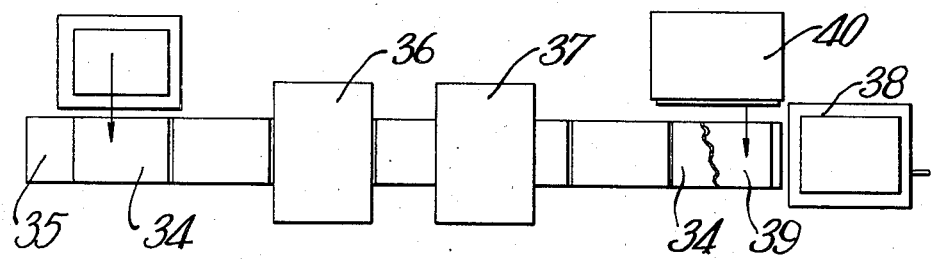
Fig. 9 is a diagrammatic plan view showing a modified form of procedure particularly adapted for the laminating of members one of which is difficult for heat to penetrate.

In accordance with the invention, members composed of wood or of a variety of other materials may be coated or united to other members. The invention contemplates the provision on a surface of a potentially reactive synthetic resinous material, and the subsequent setting of the resinous material. For such setting, pressure and heat are commonly employed conjointly, but the invention, in its broader aspects is not limited to any particular type of setting operation. In the utilization of synthetic resinous materials, it is of particular importance that no excess of the material be utilized, and that a maximum of uniformity throughout the layer of adhesive or coating material be maintained. In order to attain these ends, it is desirable to supply the potentially-reactive resinous material to a surface in powdered or other discrete-particle form. This permits the application thereof to any of a variety of materials in an especially even manner, and permits the treatment of porous materials such as wood, cardboard, paper, various types of composition board, and other porous materials without unnecessary or uneven penetration of the resinous materials into the body of the material treated. It also permits the use of resinous materials of a variety of desirable types and in a variety of desirable ways.

In certain of its aspects, moreover, the invention contemplates exercising various desirable types of control whereby uniformity in results may be attained, whereby the procedure may be simplified, and whereby a particularly effective bond and/or coating may be provided.

When a potentially-reactive resinous material is applied in powdered form to a surface of an article and the article subjected to further operations, as by having the surface of another article placed thereupon for bonding, and/or by being placed in a treating means, and/or by having a pressure plate moved thereagainst or against an article which is to be bonded thereto, difficulties due to the displacement of the particles of the resinous material occur. Even the movement of an article under and beyond a disseminating means, moreover, has a tendency, in some instances, to displace or dislodge particles of the type here under consideration. In the treatment of warped veneers, as in the formation of plywood, for example, such difficulties are particularly marked. In order to overcome these and/or other difficulties the invention contemplates the application of a liquid. Such application may be before, after, or before and after the application of the powder. In certain procedures, moreover, the application of the liquid may be along with the application of the discrete particles of the resin, as by spraying the liquid upon disseminated resin particles which are about to contact with the surface.

Preferably, the liquid is supplied in a relatively small amount, desirably in an amount not materially in excess of that required to hold the particles in place. It is desirably applied in the form of a mist or fine spray.

It is preferable to utilize a liquid, the chemical or physical properties of which are such that it will diffuse into the layer of particles of resinous material, for instance, a liquid having a greater tendency to adhere to the surfaces of the resinous particles than to cohere.

It will be understood that the liquid does not need to be a pure chemical. For instance, it may involve mixtures of liquids or solutions of solid or gaseous materials in a liquid. Desired liquids, solids, or gases may, in certain instances, be dissolved in any of a variety of solvents such as water or alcohol utilized in suitably limited amounts.

The use of a liquid which will not escape immediately into the wood or other absorbent material and which has a marked tendency to diffuse into the layer of resinous particles is particularly desirable for application thereon before the resin is applied.

The use of a material which has the ability to readily plasticize the resin is also desirable. Among such materials are resin solvents. By the use of liquids having a plasticizing effect, moreover, the use of resinous materials which are especially advanced toward the final reaction product or the application of the resin in especially coarse form is facilitated.

The use of a liquid having a minimum tendency to separate out from the reacting mass during setting is likewise desirable.

The use of liquids having high boiling points is particularly advantageous in that there is a reduced tendency toward blistering, and the use of a particularly simple procedure is permitted.

In the use of certain resinous materials,—for example, phenolic condensation products,—moreover, it is often desirable that an accelerator be present at the time of the final reaction. Such an accelerator, however, would tend to cause a premature reaction of the resinous body if it were present during the formation of the potentially-reactive product, and the invention accordingly contemplates supplying such an accelerator material at the surface before, with or after the particles, or supplying materials which will provide such an accelerator at the surface spread. Such materials are preferably provided in the form of, or as embodied in, a liquid so supplied.

Furthermore, it is often desirable that a material be present during the final reaction which will affect the strength, appearance, toughness, brittleness, smoothness or other characteristic of the bond or coating, and the invention further contemplates supplying such resin-affecting material in liquid form.

In its broader aspects, the invention contemplates the use of any of a wide variety of synthetic resinous substances. Reference may be made in particular to phenolic condensation products. Reference may also be made to urea condensation and polymerization products, and to synthetic resinous materials containing vinyl acetate and/or vinyl chloride which are thermoplastic, but not thermo-setting. In accordance with the invention, these materials are applied in a potentially-reactive condition and in discrete-particle form.

The invention is particularly adapted for the formation of plywood, which term is utilized herein to designate a laminated structure comprising one or more layers of wood and for the coating of wood and wood-containing structures.

It is to be understood that the term "wood" is utilized herein to include artificial woods having a porous structure such, for instance, as fibre or pulp boards in any desirable state of compression, as well as natural wood.

In certain instances, it is desirable that a liquid be applied after the application of the powdered resin to the end that the liquid be diffused particularly effectively about the particles, and/or that escape of liquid into wood, for example, be minimized. In other instances, it is desirable that it be applied before the same, in order to minimize displacement. In still other instances, it is desirable to apply liquid both before and after the application of the powder, in order that displacement may be held to a minimum and at the same time that a thorough diffusion of a liquid into the layer of particles may be obtained without waste. In some cases also the particles may receive a liquid while on their way to the surface.

While the invention in certain of its broader aspects contemplates the use of liquids, such for instance as mineral or vegetable oils, which neither dissolve the resinous material, enter into the reaction, or effect its properties, it is, as above stated, desirable to use a liquid which is not inert in this sense.

Among the materials which may desirably constitute, or be contained in, the liquid utilized in various procedures contemplated by the invention, particularly where the resinous material is a phenolic condensation product, are: phenol (melted or in solution) which is a resin solvent and has a plasticizing effect and a tendency to react with materials contained in resinous particles or other materials present at the glue line, and which adds to the strength of the resin and tends to darken it; cresols and other phenol-like materials having generally similar properties; furfural, which likewise is a resin solvent and has a plasticizing effect and a tendency to react with other materials which are likely to be contained in the resin particles or otherwise to be present, and which tends to darken the resin; diethylene glycol, glycerine, diethylene glycol monobutyl ether, ethylene glycol monobutyl ether, and similar compounds, which likewise have a plasticizing effect and which impart a greater flexibility to the reaction product formed in the press; sodium and potassium hydroxides (in solution) which have an accelerating effect on the reaction; ammonia solution, which has an accelerating effect, and provides an ingredient for the formation of hexamethylenetetramine; formaldehyde (in solution), which tends to react with excess phenol in the resin, or added thereto, and which provides an ingredient for the formation of hexamethylenetetramine.

It may be noted in this connection that the escape of formaldehyde during the final reaction is comparatively easy in the bonding or coating of porous material as contrasted with conditions when the final reaction is caused in a substantially closed chamber, and it is probable that the presence of an aldehyde such as furfural or formaldehyde, is desirable for this reason in the treatments using phenol-formaldehyde condensation products and the like. An accelerating effect when furural is present has been noted.

A treatment which has been found particularly efficacious in the application of an aqueous solution containing phenol, caustic soda, and ammonia prior to the resin spread, and the application of furfural after the resin spread. A desirable proportion of ingredients in such aqueous solution is 56 parts by weight of phenol, 18½ parts by weight of 20% caustic soda solution, and 7 parts by weight of 37% ammonia solution.

It is to be noted that the boiling point of the solution mentioned immediately above is 220° F., and that furfural diethylene glycol, glycerine, di-ethylene glycol monobutyl ether, and ethylene glycol monobutyl ether, as well as phenol and the cresols and a number of other solutions thereof, have boiling points higher than water, and, generally, considerably higher.

As materials which are desirable for use in connection with urea resins, reference may be made to furfural, triethanolamine, ethylene glycol monobutyl ether, diethylene glycol, monobutyl ether, chloronapthalene, and para-aldehyde, and to phenol, which may be applied, for instance, in an aqueous solution of phenol, caustic soda, and ammonia, such as mentioned above.

As materials which are desirable for use in connection with resinous materials containing vinyl acetate and/or chloride, reference may be made to triethanolamine, ethylene glycol monobutyl ether, diethylene glycol monobutyl ether, and para-aldehyde, and to phenol, which may be applied, for instance, in an aqueous solution of phenol, caustic soda, and ammonia, such as mentioned above.

Among the materials enumerated are certain ones which are particularly desirable for application on a wood surface before the application of the resin particles. Mention may be made of a phenol soda-ammonia solution such as above described, melted phenol, solutions of phenol in water, glycerine (particularly when utilized at about 150° F.), glycerine and water utilized in the proportion of three to one, glycerine and alcohol in a similar proportion, diethylene glycol, and glycol ethers such as ethylene glycol monobutyl ether and di-ethylene glycol monobutyl ether.

Certain manners in which the invention may be carried out are illustrated in the drawings.

Figs. 1, 2, and 3 illustrate procedures for applying materials. In Fig. 1 a series of members 10 to be sprayed which may be pre-cut veneer, for example, are passed by a conveyor 11 under a mechanism indicated diagrammatically at 12 for disseminating a powdered potentially-reactive synthetic resinous material, and thence under a liquid-spraying means indicated diagrammatically at 13. The powder-disseminating mechanism may, for example, be of the type described and claimed in the copending application of Louis G. Merritt and Ericsson H. Merritt, Serial No. 542,257, filed June 5, 1931. The spraying mechanism may, for example, be of the type described and claimed in the copending application of Ericsson H. Merritt and Richard W. Stanley, Serial No. 535,822, filed May 8, 1931. In Fig. 2 the members 10 are passed by the conveyor 11 first under a spraying mechanism 14 and then under a powder-disseminating mechanism 15. In Fig. 3 the members 10 are passed by the conveyor 11 under a spraying mechanism 16, a powder disseminator 17, and a spraying mechanism 18, in succession.

Figs. 4, 5, 6, and 7 illustrate generally certain of the types of procedures which may be followed after the application of the materials. As indicated in Fig. 4, a member 19 may be disposed on each member 10 after the materials have been applied thereto, and the assembly thus formed subjected to heat and pressure in a suitable press such, for instance, as a veneer press, one type of which is indicated diagrammatically at 20. As indicated in Fig. 5, a pair of members 10 may be disposed one upon the uppermost member, after which they may be pressed in a hot press 20ª. As indicated in Fig. 6, each member 10 may be individually subjected to a setting treatment as, for example, by having a hot plate pressed against the coated surface thereof, for instance, in a press 20ᵇ, whereby the resinous material thereon may be set to form an infusible coating. As indicated in Fig. 7 a multiplicity of members 10, for instance three, may be disposed one upon another and the resulting assembly subjected, as in a press 20ᶜ, to setting conditions whereby the members will be united and a surface coating of infusible synthetic resinous material provided on the upper surface.

In instances where, for efficiency of operation or for the application of different materials for coating and laminating, it is desirable to coat different plies independently, there may be used a procedure as indicated in Fig. 8. A series of members 22 are carried by a conveyor 23 under spraying, powder-disseminating, and spraying mechanism 24, 25, and 26, respectively, after which an additional member 27 is disposed thereon and the partial assembly passed under spraying, powder-disseminating and spraying mechanisms 28, 29, and 30, respectively. Next an additional member 31 is disposed thereon, whereupon the assembly is passed under spraying, powder-disseminating, and spraying mechanism 32, 33, and 34, respectively. The synthetic resinous material applied by the powder disseminator 33 may be different from that applied by the powder disseminators 25 and 29 in instances where a different resinous material is desired for laminating and coating, respectively, and similarly the liquid supplied by the spray or sprayers associated with the powder disseminator 33, may be different from the liquid supplied by the other sprayers; or other variations may be made. An assembly formed as indicated may then be subjected to a treatment whereby the final curing of the resin takes place, as, for instance, to heat and pressure in a press 20ᵈ, or in case of a thermoplastic resin which sets on cooling the assembly may then be subjected to a treatment whereby the resin is subjected to heat and pressure in press 20ᵈ whereby the resin is softened by the heat and final setting takes place when the assembly cools. The cooling may take place after removal of the assembly from the press or by cooling of the press before removal of the assembly.

The total weight of liquid supplied should preferably not exceed 50 or 60% of the weight of the resin particles and is advantageously less than such figure.

The heat utilized serves to cause a certain amount of plasticization, and, in the case of thermo setting resins, to bring about the final reaction. A desirable temperature range for the formation of plywood or the coating of wood is a press plate temperature of from 300° F. to 400°

F., and temperatures between 330° F., 340° F. are particularly desirable. Pressures of 200 pounds per square inch may be utilized. Ordinarily, the pressure should be greater than 100 pounds and less than 300 pounds. The time in the press may range from ½ minute to 4 minutes, a period between ¾ of a minute and 3½ minutes being desirable for the production of plywood for natural wood veneer.

In the treatment of wood or other water-absorbent materials it is distinctly advantageous that the moisture content be kept low,—preferably not higher than 6 to 8% of the weight of the wood or other material in order to obtain effective bonds. In instances where the wood to be utilized contains a greater amount of moisture it may be subjected to a preliminary drying treatment in any suitable manner. It may also be noted that a particularly low moisture content in the member or members markedly expedites the setting step in a number of instances. For example, members having a moisture content of 3% have been bonded in two-thirds the time required to bond members having a 6% moisture content, when similar phenolic condensation products were used and other conditions were similar.

Another feature of the invention involves the provision of a procedure whereby delay in providing heat at the glue line after a hot plate has been applied to the surface of a relatively thick and/or comparatively non-heat-penetratable outer layer is avoided. This involves the heating of the outer layer, ordinarily the upper one, before it is disposed upon the coated surface of the layer with which it is to be associated. For example, by heating a layer of thick mineral board or pulp board, or natural wood to 250° to 300° F. and placing it on a sheet, which may be of veneer, and to which resin particles, and preferably also a liquid, have been applied, and then immediately disposing the assembly on a hot-plate press, the delay in getting the heat to the glue line through the upper member and the dissipation of the heat applied through the veneer which would otherwise occur is avoided. In bonding a sheet to another ply, such as veneer, for example, the heating serves to expedite the provision of the proper heat conditions at the glue line. It is to be noted in this connection that difficulties in causing proper reaction in the reactive material occur when the heat is applied gradually while the assembly is under pressure. Again, the continued application of pressure to pulp board tends to destroy its insulating properties, and it is accordingly highly desirable to limit the time in the press when such material is used.

In Fig. 9 there is illustrated a procedure wherein resin particles are applied to a ply and a heated ply disposed thereon. Plies 34 are carried on a conveyor 35 under one or more disseminators, for instance the disseminators 36 and 37, and toward the hot plates of the press 38. As each ply 34 approaches the press, a ply 39, which has been heated in a heating means 40 is placed thereupon, and the assembly moved immediately into the press 38 and the resin set therein. By this means a setting temperature may be applied to the resinous material promptly even though the plies 39 are of considerable thickness and/or are formed of material which is particularly resistant to penetration by heat.

As an example of a phenolic condensation product which may be utilized in accordance with the invention, reference may be made to a potentially-reactive product formed as follows:

Place 200 grams warm phenol in a metal container about 4" diameter by 5" high arranged for the attaching of a reflux, and add 20 grams of KOH dissolved in 20 cc. water, add while stirring 300 grams—37% formaldehyde solution. Attach reflux and apply heat until mass boils freely, then remove heat, as action is exothermic, for about 5 minutes or until boiling ceases. Then again apply heat and boil with reflux for a total time of one hour and ten mnutes, then remove reflux. The fluid while hot, will be rather viscous but still capable of being easily stirred. The fluid should now be stirred while still applying heat to evaporate free water and phenol. When the mass becomes too stiff for stirring, it should be removed from the container and cooled slowly. The total mass of the resin will be approximately 370 grams. After complete cooling the mass is hard and brittle and can be broken up and ground to a powder.

An example of the spreading steps of a procedure which has yielded particularly satisfactory results in the formation of plywood containing three wood plies (for instance $\frac{1}{16}$ inch birch plies containing 4% moisture content) bonded by a phenolic condensation product is as follows: An aqueous solution, the ingredients of which are 56 parts of phenol, 18½ parts of 20% caustic soda solution, and 7 parts of 37% ammonia solution is sprayed on the surfaces at the rate of 6 pounds per thousand square feet of double glue line, after which a potentially-reactive phenolic condensation product in powdered form is applied at the rate of 25 pounds per thousand square feet of double glue line, and this is followed by a spray of furfural at a rate of 4 pounds per thousand square feet of double glue line.

As another example: The above-mentioned phenol-soda-ammonia solution may be applied at the rate of 6 pounds prior to the resin spread and at the rate of 6 pounds thereafter.

As another example: the above-mentioned phenol-soda-ammonia solution may be spread at the rate of 6 pounds prior to the resin spread and a 40% formaldehyde solution may be spread at the rate of 3 pounds after the resin spread.

As a further example: The above-mentioned phenol-soda-ammonia solution may be spread at the rate of 6 to 12 pounds prior to the resin spread.

As a further example: A powdered potentially-reactive phenolic condensation product may be spread on veneer plies at a rate of 26.5 pounds per 1000 square feet of double glue line, and a mixture of two parts of water, three parts of ethyl alcohol and ten parts of furfural may be sprayed on at a rate of approximately 6 pounds per thousand square feet of double glue line prior to the application of the resin, and 6 pounds thereafter.

As another example, reference may be made to a procedure wherein a potentially-reactive phenolic condensation product is applied in powdered form to the surface of a veneer sheet, and furfural sprayed thereon in the proportion of one-half part by weight of resin. In some instances, the furfural may be sprayed before the resin spread, if desired.

As still another example, reference may be made to a procedure wherein a potentially-reactive phenolic condensation product is applied to veneer sheets at the rate of twenty-five pounds per 1000 feet of double glue line, and this spread preceded by a spray of phenol solution at a rate of 6 pounds and followed by a spray of 6 pounds of 10% sodium hydroxide solution.

As another example: Ethylene glycol monobutyl ether may be spread on the surface of wood at a rate of 8 pounds in the coating of a surface, this being followed by a spread of powdered, potentially-reactive phenolic condensation product at a rate of 25 pounds. This material may likewise be applied after the resin spread either with or without the preliminary spraying of this or another material. The preliminary spread of 8 pounds of ethylene glycol monobutyl ether with a subsequent spray of from 3 to 5 pounds is desirably utilized with resin spreads up to 40 pounds.

As one example of a procedure for coating natural wood, reference may be made to spraying before or after the phenolic condensation product is spread, or both, a solution of 75% glycerine and 25% water or 25% of ethyl alcohol. Desirably this is applied, at a rate of 8 pounds, before a 25 pound resin spread and also at a rate of 4 pounds, thereafter.

In certain instances it may be desirable to utilize a volatile resin solvent in a relatively small quantity at a suitable stage in the procedure. For example, a lower alcohol or acetone may be used after the application of the resin, as for instance, in coating procedures where other liquids may be less desirable, suitable precautions being taken. Preferably, the quantity of such material utilized should not be more than 25% of the weight of the resin, nor more than 1 to 2% of total weight of the wood or other absorbent material being treated. Similarly, the proportion of water contained in the applied liquids should preferably not exceed 1 to 2% of the weight of the wood or other water-absorbent material treated. If water and alcohol are both utilized the total amount should preferably be kept under this figure.

A wide number of laminated products may be produced in accordance with the invention. Among them are products containing layers of wood and wood (which in either case may be pulp or fibre board compressed or otherwise), layers of wood and metal, layers of wood and mineral board, layers of wood and fabric, layers of wood and paper, layers of mineral board and paper or fabric. A wide number of coated products may also be produced, including coated wood, and coated composite structures, such as a paper or fabric layer united to wood, mineral board, etc.

In the formation of products from members containing dyes or in forming resin coatings on members, it is desirable to use a liquid which will not adversely affect the dye or which will not impart an undesired color to the final product.

It is to be observed that the invention permits a bonding or coating procedure to be readily and effectively carried out without the application of heat to the layer of resin particles until the bonding treatment—i. e. until the article is placed in the press or until it is just about to be placed in the press. The elimination of the necessity of such prior heat treatment expedites and facilitates the procedure, and avoids the necessity of especially accurate control which is inherent in such methods.

In certain cases, however, it has been found desirable to pretreat wood before the application of a liquid in order to affect the liquid. As an example of such procedure, reference may be made to heating a veneer sheet and applying diethylene glycol thereto while the sheet is somewhat hot, for example, at a temperature of 150° F., and thereupon promptly applying powdered resinous material. The heat acts to reduce the viscosity of the diethylene glycol and the resin as spread takes it up without material penetration of the glycol into the wood. It may be noted in this connection that the diethylene glycol imparts flexibility to a final phenolic condensation product, and it consequently is particularly desirable for use in coating.

Reference is made to the co-pending applications of Ericsson H. Merritt, Serial No. 582,253, filed December 21, 1931, and Serial No. 597,448, filed herewith.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a mater of language, might be said to fall therebetween.

Having described my invention, what I claim as new and desire to secure by Letters Patent is:

1. The process of coating, laminating and the like with a synthetic resinous material, which comprises the application of the synthetic resinous material to a surface in a potentially-reactive state and in non-penetrating powder form, and preventing the displacement of powder without causing penetration thereof by the independent application at said surface of a resin-free, non-oleaginous liquid which has a relatively great tendency to diffuse over the resin particles whereby the particles are held in place by the presence of a relatively small amount of liquid and which is solvent for said resinous material, and the subsequent setting of the resinous material.

2. The process of coating, laminating and the like with a synthetic resinous material, which comprises the application of the synthetic resinous material to a surface in a potentially-reactive state and in non-penetrating powder form, and preventing the displacement of powder without causing penetration thereof by the application at said surface of a liquid which has a relatively great tendency to diffuse over the resin particles whereby the particles are held in place by the presence of a relatively small amount of liquid and which will provide an accelerator for the setting reaction, said liquid being resin-free and non-oleaginous, and the subsequent setting of the resinous material.

3. The process of coating, laminating and the like with a synthetic resinous material, which comprises the application of the synthetic resinous material to a surface in a potentially-reactive state and in non-penetrating powder form, and preventing the displacement of powder without causing penetration thereof by the independent application at said surface of a resin-free, non-oleaginous liquid which has a relatively great tendency to diffuse over the resin particles whereby the particles are held in place by the presence of a relatively small amount of liquid and which will affect the quality of the reacted resinous material, and the subsequent setting of the resinous material.

4. The process of coating, laminating and the like with a synthetic resinous material, which comprises the application of the synthetic resinous material to a surface in a potentially reactive state and in non-penetrating powder form, and preventing the displacement of powder without causing penetration thereof by the independent application at said surface of a liquid having a relatively great tendency to diffuse over the resin particles whereby the particles are held in place by the presence of a relatively small amount of liquid and embodying phenol, said liquid being resin-free and non-oleaginous, and the subsequent setting of the resinous material.

5. The process of coating, laminating and the like with a synthetic resinous material, which comprises the application of the synthetic resinous material to a surface in a potentially-reactive state and in discrete-particle form and the independent application of furfural and the subsequent setting of the resinous material.

6. The process of coating, laminating and the like, which comprises the application to a surface of a heat plasticizable synthetic resinous material in discrete-particle form and an aqueous solution containing phenol, caustic soda and ammonia, and the subjection thereof to heat and pressure.

7. The process of coating, laminating and the like with a synthetic resinous material, which comprises first applying to a surface of an aqueous solution containing phenol, caustic soda and ammonia, then applying at said surface a synthetic resinous material in a potentially-reactive state and in powdered form, and then applying furfural at said surface, and the subjection thereof to heat and pressure.

8. The process of coating, laminating and the like with a synthetic resinous material, which comprises the application of the synthetic resinous material to a surface in a potentially-reactive state and in discrete-particle form and the independent application of a liquid embodying a glycol compound, and the subsequent setting of the resinous material.

9. The process of coating, laminating and the like with a synthetic resinous material, which comprises the application of the synthetic resinous material to a surface in a potentially-reactive state and in non-penetrating powder form, and preventing the displacement of powder without causing penetration thereof by the independent application at said surface of a resin-free, non-oleaginous liquid having a relatively great tendency to diffuse over the resin particles whereby the particles are held in place by the presence of a relatively small amount of liquid, and the subsequent application of heat and pressure, said liquid embodying material which will react with other materials present when heat is applied.

10. A process of coating, laminating and the like, which comprises the application of synthetic resinous material to a surface in a potentially-reactive state and in powder form and the independent application at said surface of liquid having a relatively great tendency to diffuse over the resin particles, whereby the particles are held in place by the presence of a relatively small quantity of liquid providing materials from which a synthetic resinous material may be formed by chemical reaction, and subsequently applying heat and pressure.

11. The process of coating, laminating or the like, with a synthetic resinous material, which comprises applying to a surface of an article to be coated and laminated, the synthetic resinous material in a potentially reactive state and in a powder form, independently applying at the said surface a relatively small amount of a fixing liquid for the said material, the said liquid plasticizing the resinous material and having a relatively great tendency to diffuse over the resin particles to hold the said particles in place, and effecting a setting of the resinous material, thereby preventing displacement of the said material during laminating operations on the said surface.

12. The process of coating, laminating, and the like, with a synthetic resinous material, which comprises applying to a surface of an article to be coated and laminated, the synthetic resinous material in a potentially reactive state and in a powder form, applying at the said surface a relatively small amount of an organic fixing liquid for the said material, the said liquid being free from resins and oleaginous substances and having a relatively strong tendency to diffuse over the resin particles to hold the said particles in place, and effecting a setting of the resinous material, thereby preventing displacement of the said material during laminating operations on the said surface.

13. The process of coating, laminating, and the like, with a synthetic resinous material, which comprises applying to a surface of an article to be coated and laminated the synthetic resinous material in a potentially reactive state and in a powder form, then applying at the said surface subsequent to applying the said resinous powder a relatively small amount of an organic fixing liquid for the said powder, the said liquid plasticizing the said resinous powder but being itself free from resins and oleaginous substances and having a relatively great tendency to diffuse over the resin particles, and effecting a setting of the resinous material, thereby preventing displacement of the said material during laminating operations on the said surface.

14. The process of coating, laminating, and the like, with a synthetic resinous material, which comprises applying to a surface of an article to be coated and laminated an organic fixing liquid for the resinous material to be used, then applying the said resinous material in a potentially reactive state and in powder form, the said material being applied to the surface while the surface is wet with the liquid and in quantities relatively larger than the amount of liquid on the surface, the said liquid being free from resinous and oleaginous substances and having a relatively great tendency to diffuse over the resin particles to thoroughly wet the same, then applying further quantities of the liquid to the applied powder, and thereafter effecting a setting of the said powder, thereby preventing displacement of the said powder during laminating operations on the said surface.

15. The process of coating, laminating, and the like, with a synthetic resinous material, which comprises applying to an article to be coated and laminated the synthetic resinous material in a potentially reactive state and in a powder form, applying at the said surface a relatively small amount of a low-volatile organic fixing liquid for the said resinous material, the said liquid being free from resinous and oleaginous substances and having a relatively great tendency to diffuse over the resin particles, and thereafter subjecting the article to sufficient heat and pressure to set the resinous material, thereby preventing displacement of the said material during laminating operations.

16. The process of coating and bonding wood, which comprises applying to a surface of wood to be bonded an organic fixing liquid for a synthetic resin, thereafter applying at the said surface a powdered, potentially reactive synthetic resinous material, the said liquid being substantially non-absorbtive by the wood but having a relatively great tendency to diffuse over the resin particles, allowing the resin particles to be plasticized by the liquid, whereby the resin particles are held in place by the liquid, and subsequently subjecting the thus-coated wood to heat and pressure.

17. The process of coating, laminating, or the like, porous articles with a synthetic resinous material, which comprises reducing the moisture content of the articles to not more than approximately 8%, applying to the surface of the articles a powdered synthetic resinous material in a potentially reactive state, independently applying at the said surface a relatively small quantity of an organic fixing liquid for the resinous material, the said liquid being free from resins and oleaginous substances and having a relatively great tendency to diffuse over the resin particles, and subsequently subjecting the thus-treated articles to heat and pressure to set the resinous material for holding the same in place against displacement during laminating operations.

18. The processes of coating, laminating, and the like, porous articles with a synthetic resinous material, which comprises reducing the moisture content of the articles to not more than approximately 8%, applying to a surface of the articles a powdered, synthetic resinous material in a potentially reactive state in the presence of a relatively small amount of a low-volatile organic fixing liquid, the said liquid being present on the surface in an amount ranging from relative small but effective amounts to not more than approximately 60% of the weight of the resinous material, the said liquid having a relatively great tendency to diffuse over the particles of resinous material, and applying heat and pressure to the thus-treated articles for holding the resinous material in place against displacement during laminating operations.

19. The process of coating, laminating, or the like, which comprises applying to a surface of an article to be coated and laminated a synthetic resinous material in a potentially active state and in powder form, and independently applying to the surface an organic plasticizing liquid for the said material, the said liquid being applied in amounts ranging from relatively small but effective amounts to not more than approximately 60% of the weight of the resinous material and having a relatively great tendency to diffuse over the resin particles, and subsequently applying heat and pressure to the article to set the resinous material and to hold the same in place during laminating operations.

20. The process as claimed in claim 19, in which the synthetic resinous material is a phenolic condensation product.

21. The process of coating, laminating, or the like, with a synthetic resinous material, which comprises applying to a surface of an article to be coated and laminated, the synthetic resinous material in a potentially reactive state and in powder form, plasticizing the said powdered resinous material in situ on the surface by applying to the surface a relatively small amount of a plasticizing liquid for the resinous material having a relatively great tendency to diffuse over the resin particles to hold the said particles in place, and effecting a setting of the resinous material, thereby preventing displacement of the said material during laminating operations on the said surface.

ERICSSON H. MERRITT.